US012693056B2

(12) United States Patent
      Qiao et al.

(10) Patent No.: US 12,693,056 B2
(45) Date of Patent: Jul. 28, 2026

(54) CONNECTION APPARATUS AND INTEGRATED ASSEMBLY

(71) Applicant: ZHEJIANG SANHUA AUTOMOTIVE COMPONENTS CO., LTD., Hangzhou (CN)

(72) Inventors: Mingyu Qiao, Hangzhou (CN); Chao Shi, Hangzhou (CN); Jianmin Zhang, Hangzhou (CN); Shifeng Hu, Hangzhou (CN)

(73) Assignee: ZHEJIANG SANHUA AUTOMOTIVE COMPONENTS CO., LTD., Hangzhou (CN)

( * ) Notice: Subject to any disclaimer, the term of this patent is extended or adjusted under 35 U.S.C. 154(b) by 138 days.

(21) Appl. No.: 18/557,935

(22) PCT Filed: Apr. 22, 2022

(86) PCT No.: PCT/CN2022/088420
     § 371 (c)(1),
     (2) Date: Oct. 29, 2023

(87) PCT Pub. No.: WO2022/228298
     PCT Pub. Date: Nov. 3, 2022

(65) Prior Publication Data
     US 2024/0230184 A1     Jul. 11, 2024

(30) Foreign Application Priority Data
     Apr. 30, 2021    (CN) .......................... 202110482766.8

(51) Int. Cl.
     *F25B 41/40*        (2021.01)
     *B60H 1/00*         (2006.01)
                        (Continued)

(52) U.S. Cl.
     CPC ......... *F25B 41/40* (2021.01); *B60H 1/00485* (2013.01); *B60H 1/3227* (2013.01); *B60H 1/3229* (2013.01); *F25B 41/20* (2021.01)

(58) Field of Classification Search
     CPC . B60H 1/3227; B60H 1/3228; B60H 17/3229
     See application file for complete search history.

(56) References Cited

U.S. PATENT DOCUMENTS 11,192,425 B2 * 12/2021 Oh ...................... B60H 1/00007
11,440,376 B2 *  9/2022 Calderone ............... F25B 41/40
                        (Continued)

FOREIGN PATENT DOCUMENTS

CN      106655710 A      5/2017
CN      108068572 A      5/2018
                        (Continued)

OTHER PUBLICATIONS

Chinese First Office Action issued on Jul. 26, 2023 for the Chinese priority application No. 202110482766.8.
                        (Continued)

*Primary Examiner* — Christopher R Zerphey
(74) *Attorney, Agent, or Firm* — Yue (Robert) Xu; Apex Attorneys at Law, LLP

(57)            ABSTRACT

A connection apparatus and an integrated assembly are provided. The connection apparatus comprises a base portion and a flow passage portion which are limited and/or fixedly provided. The connection apparatus comprises a plurality of element connection portions and a plurality of external interfaces that can be used for connecting to a system. The base portion comprises at least two accommodating portions. The flow passage portion comprises at least two modules and a connection part, and the modules are partially located in the accommodating portions. The base portion is provided with a limiting structure that limits the
                        (Continued)

movement of the modules and a notch portion that is at least arranged between two adjacent accommodating portions. The connection apparatus is provided with the connection part that connects at least one group of two adjacent modules, and the connection part is partially located at the notch portion.

15 Claims, 7 Drawing Sheets

(51) Int. Cl.
    *B60H 1/32*        (2006.01)
    *F25B 41/20*      (2021.01)

(56)          References Cited

U.S. PATENT DOCUMENTS

| | | | |
|---|---|---|---|
| 11,453,267 B2 * | 9/2022 | Koberstein | B60H 1/00907 |
| 2003/0037828 A1 * | 2/2003 | Gander | F16H 61/0009 |
| | | | 137/884 |
| 2017/0127561 A1 | 5/2017 | You et al. | |
| 2019/0047373 A1 | 2/2019 | Kim et al. | |
| 2020/0276879 A1 | 9/2020 | Kim et al. | |

| | | | |
|---|---|---|---|
| 2020/0353811 A1 * | 11/2020 | Wolf | B60K 1/00 |
| 2023/0141829 A1 * | 5/2023 | Busch | B60H 1/3229 |
| | | | 62/244 |

FOREIGN PATENT DOCUMENTS

| | | |
|---|---|---|
| CN | 109383217 A | 2/2019 |
| CN | 109489313 A | 3/2019 |
| CN | 110411261 A | 11/2019 |
| CN | 111038216 A | 4/2020 |
| CN | 111098654 A | 5/2020 |
| CN | 111811153 A | 10/2020 |
| CN | 211764805 U | 10/2020 |
| CN | 112026677 A | 12/2020 |
| CN | 112431946 A | 3/2021 |
| CN | 112543712 A | 3/2021 |
| JP | 2018184075 A | 11/2018 |
| KR | 102122996 B1 | 6/2020 |
| WO | 2019066330 A1 | 4/2019 |
| WO | 2020186589 A1 | 9/2020 |

OTHER PUBLICATIONS

European Search Report issued on Mar. 25, 2025 for the European Search Report No. 22794769.4.
International Search Report for PCT/CN2022/088420 mailed Jul. 5, 2022, ISA/CN.

* cited by examiner

CONNECTION APPARATUS AND INTEGRATED ASSEMBLY

This disclosure is a national phase application of PCT international patent application PCT/CN2022/088420, filed on Apr. 22, 2022 which claims the priority of the Chinese Patent Application No. 202110482766.8, titled "CONNECTION APPARATUS AND INTEGRATED ASSEMBLY", filed on Apr. 30, 2021 with the China National Intellectual Property Administration, which are incorporated herein by reference in its entirety.

FIELD

The present disclosure relates to the technical field of a thermal management system for vehicle, and in particular to a connection apparatus and an integrated assembly formed by combining the connection apparatus.

BACKGROUND

The vehicle thermal management system includes a number of components. For example, the thermal management system generally includes a heat exchange assembly such as an intermediate heat exchanger and a plate heat exchanger, a throttling element, a fluid assembly such as a vapor-liquid separator or a liquid reservoir, and a control valve. These components are connected by pipelines and are fixedly arranged in the system. Since there are a large number of components in the system, the pipeline connection of the system is relatively complicated.

SUMMARY

In order to provide a connection apparatus with relatively simple and convenient connection in system connection, the following technical solution is provided according to the present disclosure.

A connection apparatus includes a base portion and a flow passage portion which are limited and/or fixedly arranged. The connection apparatus includes multiple element connection portions and multiple external interfaces used for connection with a system. The base portion includes accommodating portions, and the flow passage portion includes at least three modules and a connection part. Each of the modules is partially located in the corresponding accommodating portion, and the base portion is provided with a limiting structure that limits a movement of the modules.

The base portion is provided with a notch portion, which is at least arranged between two adjacent accommodating portions, and the two adjacent accommodating portions are provided with the modules respectively. The connection apparatus includes at least one connection part, which connects the respective module arranged in the two adjacent accommodating portions and is partially located in the notch portion.

Herein, a limiting arrangement between the connection part and the base portion includes a case that the base portion is provided with a convex structure and the connection part is provided with a concave structure, where the convex structure is limited and fitted with the concave structure, and also includes a case that the base portion is provided with a concave structure and the connection part is provided with a convex structure, where the concave structure is fitted and limited with the concave structure.

The base portion may have a limit-fitting portion, the connection part has a limiting portion, and the connection part and the base portion are limitedly arranged. The connection apparatus includes more than three modules, and the base portion includes a frame and a protrusion portion, where the frame is arranged at a relative outer side of the base portion, and the protrusion portion is arranged at a relative inner side of the frame of the base portion. The base portion includes accommodating portions in accordance with the number of the modules, and part of the protrusion portions are arranged between the accommodating portions.

Two adjacent accommodating portions provided with notch portions are defined as a first accommodating portion and a second accommodating portion, where the module at least partially located in the first accommodating portion is defined as a first module, and the module at least partially located in the second accommodating portion is defined as a second module, and the connection part of the connection apparatus connects the first module with the second module. The protrusion portion is arranged between the first accommodating portion and the second accommodating portion and protrudes from a bottom plate portion of the base portion. The limiting or fixing between the flow passage portion and the base portion is implemented by at least one fixing manner of snap fitting, threaded connection and mounting plate combined with screw connection.

The connection apparatus includes at least three element connection portions arranged opposite to the bottom plate portion of the base portion and includes at least three external interfaces with openings arranged opposite to the bottom plate portion of the base portion. One of the first module and the second module is provided with at least three lateral interface portions, which are respectively arranged on at least two sides of the first module, and the other of the first module and the second module is provided with at least two lateral interface portions.

The flow passage portion further includes a third module, a fourth module and a fifth module, and the base portion further includes a third accommodating portion, a fourth accommodating portion and a fifth accommodating portion. The third module is at least partially located in the third accommodating portion, the fourth module is at least partially located in the fourth accommodating portion, and the fifth module is at least partially located in the fifth accommodating portion. The notch portion is arranged between the second accommodating portion and the third accommodating portion, and the connection part is provided for a connection between the second module and the third module, and the connection part connecting the second module with the third module is at least partially located in the notch portion between the second accommodating portion and the third accommodating portion.

One of the first module and the second module is provided with at least three lateral interface portions which are respectively arranged on at least two sides of the first module, and the other of the first module and the second module is provided with at least two lateral interface portions. The connection part is provided with a sealing groove at a position where the connection part is fitted with the interface portion, and the connection apparatus further includes a sealing component, where the sealing component is at least partially located in the sealing groove, and the connection part is sealed to a hole of the interface portion of the module through the fitting of the sealing component. The connection part is further provided with a limiting portion, and a limit-fitting portion is arranged at a position of the base portion corresponding to the connection part, where the limit-fitting portion and the limiting portion are fitted in a concavely-to-convexly way to implement limiting.

The base portion includes a bottom plate portion in which a hole is provided, a main body portion of the base portion is made of plastic, and the base portion includes a snap portion and a threaded-connection portion, where the snap portion and the threaded-connection portion are integrated with or relatively limited or fixed with the main body portion of the base portion. The main body portion of the base portion includes a first convex rib and a second convex rib, where the first convex rib and the second convex rib protrude from the bottom plate portion, and the first convex rib is intersected with or is connected with the second convex rib. Herein, the bottom plate portion is not limited to a shape of a flat plate, but can be in various shapes, and the bottom plate portion mainly performs a function of supporting.

The frame may have a notch portion. The base portion includes a limiting portion, the frame or the protrusion portion includes the limiting portion, and the base portion is provided with a guide portion at the limiting portion, and the guide portion is relatively close to the accommodating portion. Each accommodating portion corresponds to at least two guide portions.

The integrated assembly includes a heat exchange portion, which includes two flow passages and the heat exchange portion has four interfaces, where at least one interface of the heat exchange portion is connected with one of the modules, and one interface of the heat exchange portion is connected with another the module. At least two of the modules are connected with each other through the heat exchange portion.

The base portion includes a bottom plate portion, where a side of the bottom plate portion of the base portion is defined as a lower part, and an upper part of the accommodating portion is larger than the lower part of the accommodating portion, and the accommodating portion is larger than a fitting part of the module corresponding to the accommodating portion.

An integrated assembly is further provided, which includes the connection apparatus according to the above, where the integrated assembly includes at least three valves, which are arranged to be fixed or limited with the connection apparatus. The integrated assembly includes at least one of a sensing element, a fluid assembly and a heat exchange portion which is limited or fixed with the connection apparatus. A limiting or fixing manner of the valves with the connection apparatus includes at least one of fixing manners such as snap fitting, threaded connection and mounting plate combined with thread connection. A limiting or fixing manner for the sensing element or fluid assembly or heat exchange portion and the connection apparatus includes at least one of fixing manners such as snap fitting, threaded connection and mounting plate combined with thread connection.

In the context, the external interface portion refers to a part which is provided with an interface to connect with other components of the system, and may be a module with an external interface or an interface portion of a module. The heat exchange interface portion refers to a part which is provided with an interface connected with the heat exchange portion, and may be a separate module or a part of a module.

In the above-mentioned connection apparatus, the base portion and the flow passage portion are arranged separately, and then the relatively limiting or fixing is implemented, so that the flow passage portion is formed by combining required modules with the interface portion, and then the relatively fixing of the connection apparatus is implemented by the base portion, which facilities of manufacturing.

Furthermore, with the assembly in a combination way, it facilitates the processing and can reduce the cost loss.

Figure 1:
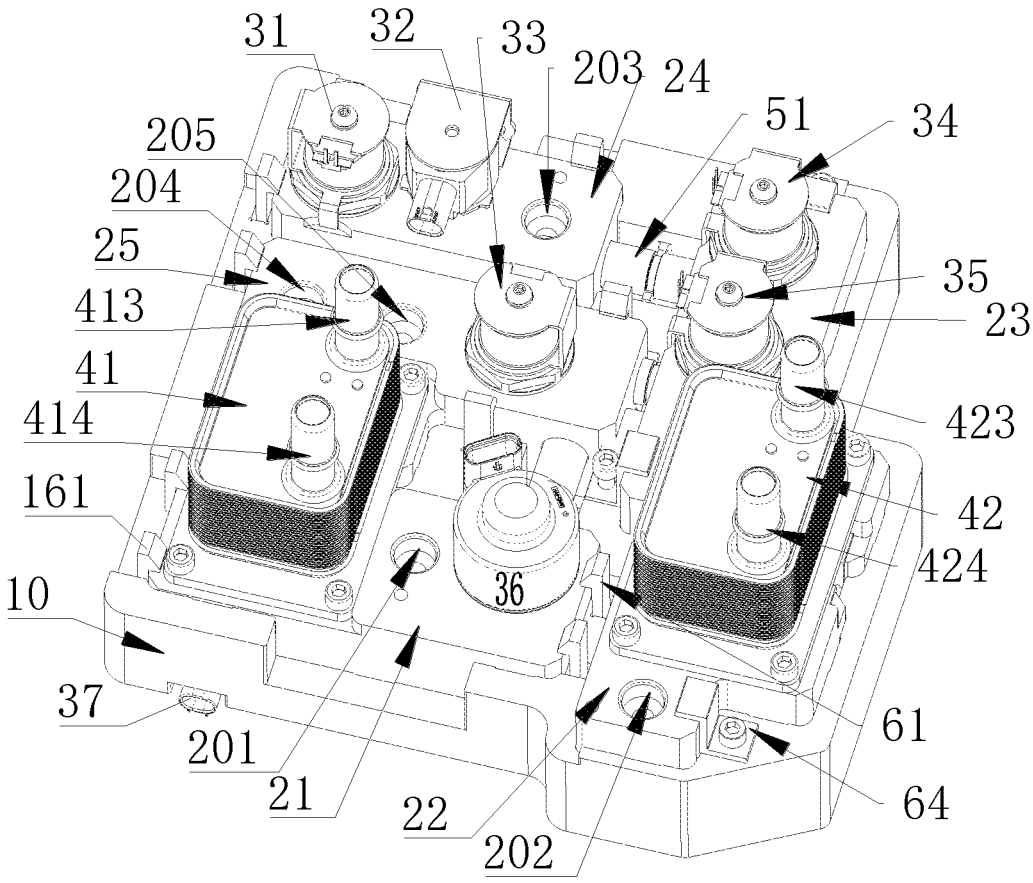
FIG. 1 is a schematic perspective view of an integrated assembly according to an embodiment.

Reference numerals in the drawings are listed as follows:

10 base portion; 100 bottom plate portion; 101 first accommodating portion; 102 second accommodating portion; 103 third accommodating portion; 104 fourth accommodating portion; 105 fifth accommodating portion; 111, 112, 113, 114, 115 notch portion; 121 limit-fitting portion; 1211 guide portion; 131 frame; 1310 gap; 1311 guide portion; 132 protrusion portion; 1321 guide portion; 141 first convex rib; 142 second convex rib; 151 threaded-fit portion; 152 snap-fit portion; 161 snap portion;

20 flow passage portion; 201 first external interface; 202 second external interface; 203 third external interface; 204 fourth external interface; 205 fifth external interface; 206 element connection portion; 21 third module; 22 fourth module; 23 fifth module; 24 first module; 241 element connection portion; 242, 243, 244 interface portion; 25, second module; 251, 253, 254 interface portion; 252 element connection portion;

31 first valve; 32 second valve; 33 third valve; 34 fourth valve; 35 fifth valve; 36 sixth valve; 37 seventh valve; 41 first heat exchange portion; 411 first heat exchange interface portion; 412 second heat exchange interface portion; 413 first heat exchange external interface portion; 414 second heat exchange external interface portion; 42 second heat exchange portion; 421 third heat exchange interface portion; 422 fourth heat exchange interface portion; 423 third heat exchange external interface portion; 424 fourth heat exchange external interface portion; 43 sensing element;

51 connection part; 511, 512 sealing groove; 513 limiting portion;

61 snap portion; 62 threaded-fit portion; 63 threaded-connection portion; 64 mounting plate; 65 sealing component.

DETAILED DESCRIPTION OF THE EMBODIMENTS

The technical solution will be described below in combination with specific embodiments. An integrated assembly includes a connection apparatus, which includes a base portion and a flow passage portion. The flow passage portion includes at least three modules, each of which has two or more interfaces, and the modules are in communication with each other through a connection portion, a heat exchange portion or other components, and the interface of at least one of the modules is in communication with one interface of at least one other module. The base portion is configured for placing and limiting the flow passage portion and is easy for being connected and mounted to the system, for example, the flow passage portion can be relatively fixed or limited with manner of fixing or limiting. The base portion can be fixed with the system, the flow passage portion has multiple external interfaces connected with the system, and the flow passage portion is relatively fixed or limited by the base portion, so that the influence on the flow passage portion caused by vibration during transportation or system operation can be reduced. The integrated assembly includes a connection apparatus and components that can be fixed or limited with the connection apparatus, such as one or more of fluid assembly such as a valve for fluid control, a vapor-liquid separator or a liquid reservoir, a heat exchange portion, a sensing element and the like, where the valve may be a control valve, a one-way valve, a throttle valve, a reversing valve and the like. The flow passage portion may include multiple modules, each of which has at least two interfaces, and a position where an interface are arranged is defined as an interface portion, which can be connected with the components, so that a chamber of the interface portion can be in communication with a corresponding part of the corresponding component. For example, it is possible that one module is able to be connected with one or more components, and it is also possible that the two modules each have a respective part that is connected with one component. Herein, the interface portion used for connection with the components is defined as the element connection portion.

Figure 2:
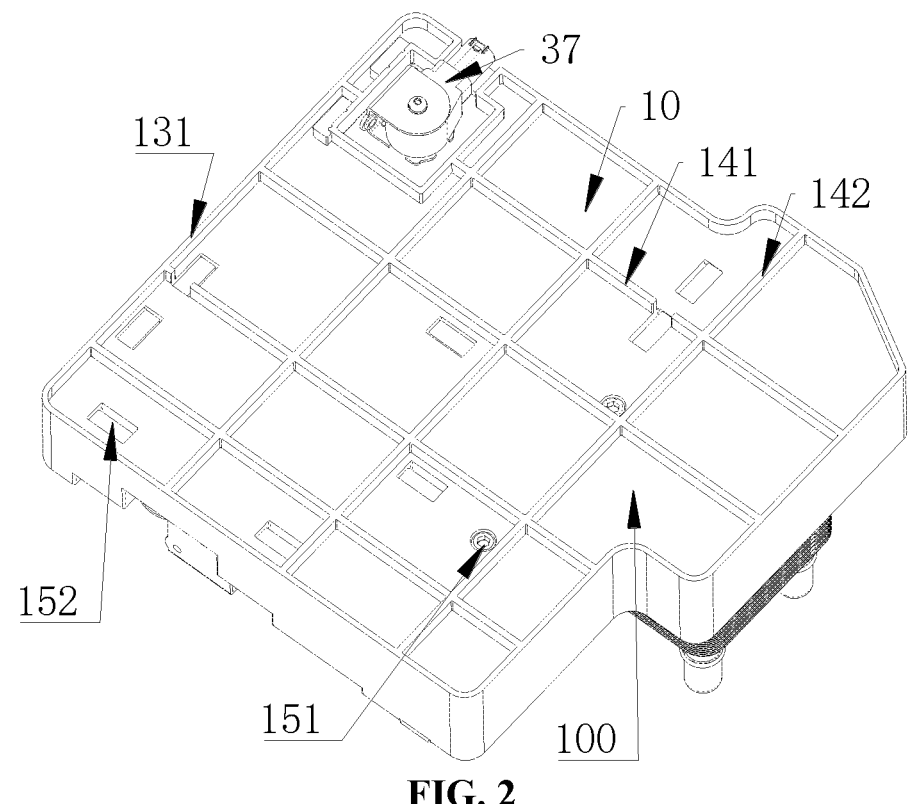
FIG. 2 is a schematic perspective view of the integrated assembly shown in FIG. 1 viewed from back side.
Figure 3:
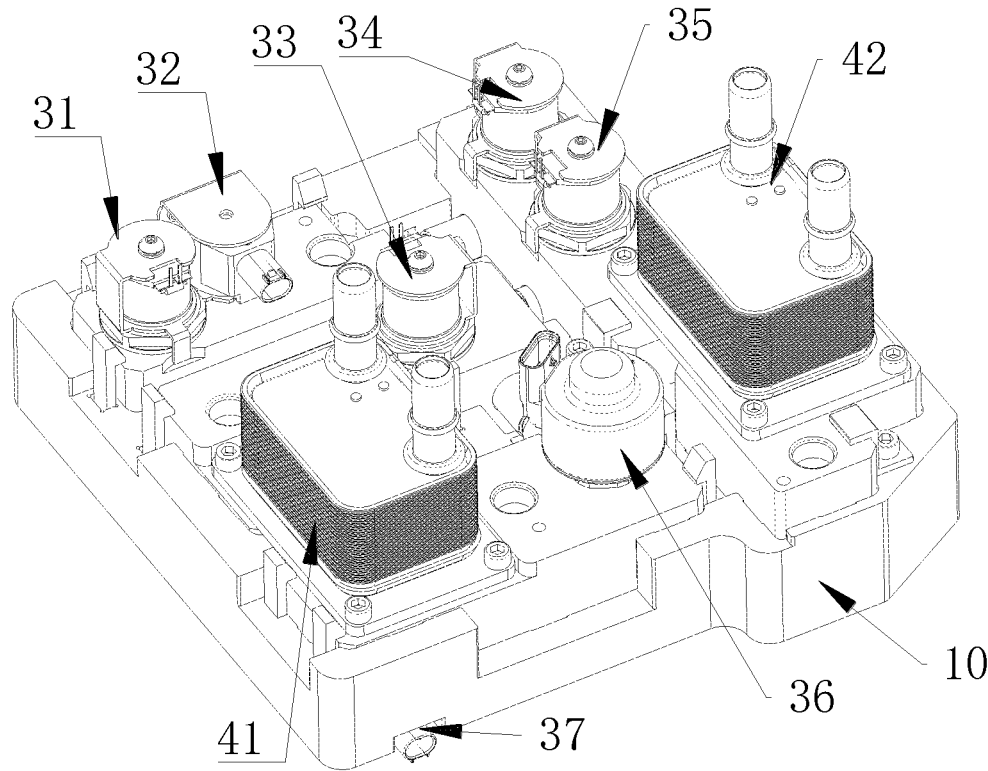
FIG. 3 is a schematic perspective view of the integrated assembly shown in FIG. 1 from another perspective.
Figure 4:
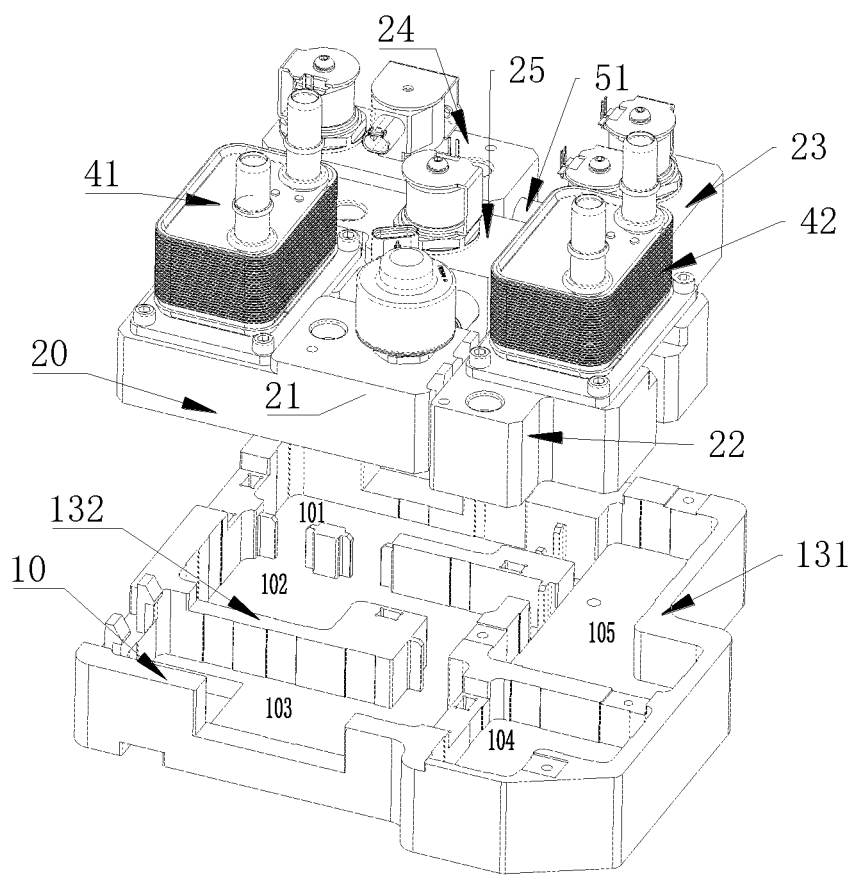
FIG. 4 is a schematic perspective view of the integrated assembly shown in FIG. 1, which is exploded into two parts.
Figure 5:
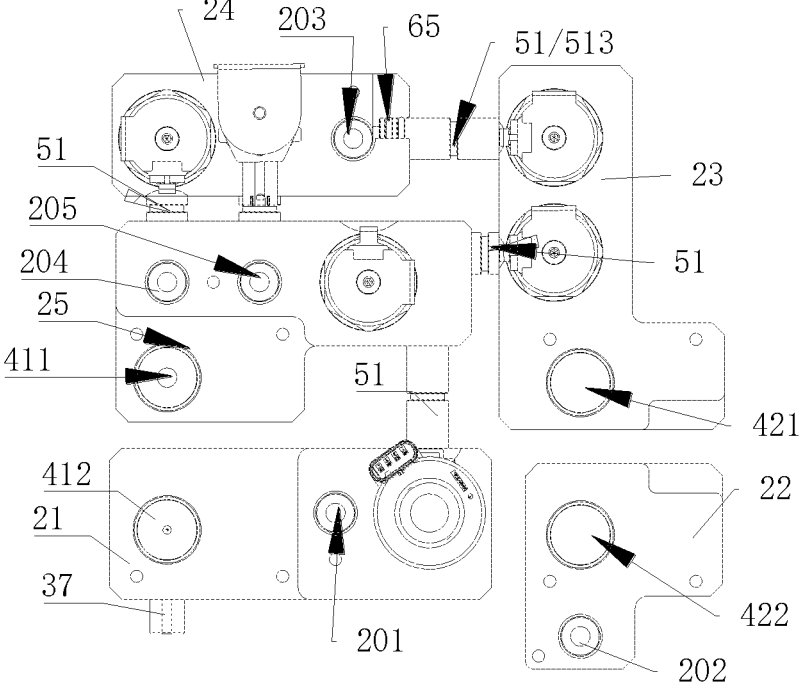
FIG. 5 is a partial schematic perspective view of a flow passage portion, with a valve, of the above integrated assembly.
Figure 6:
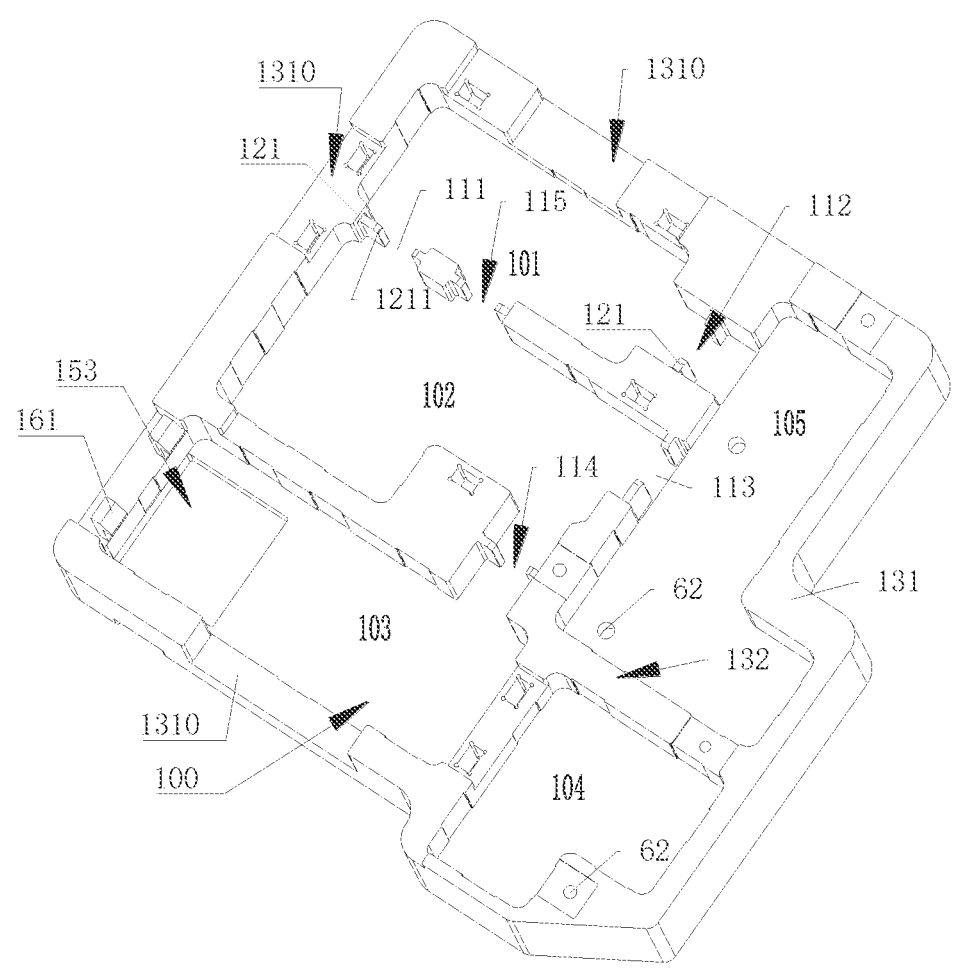
FIG. 6 is a schematic perspective view of a base portion of the above integrated assembly.
Figure 7:
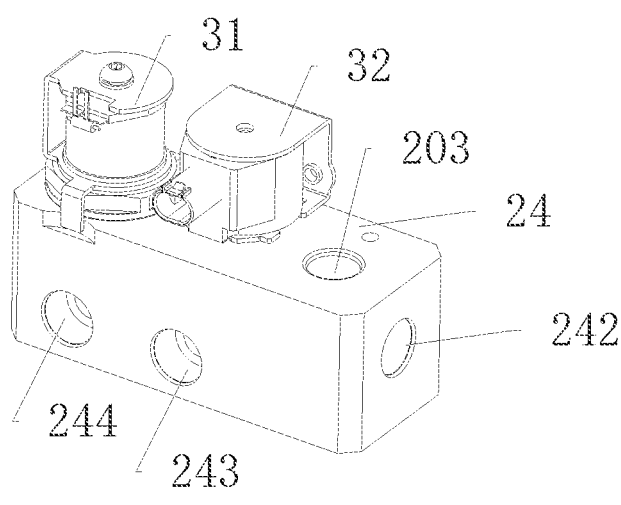
FIG. 7 is a schematic view of a first module, with a valve, of the above integrated assembly.
Figure 8:
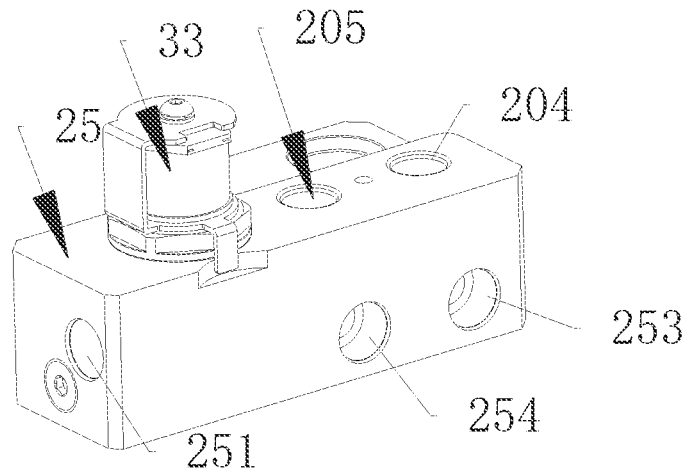
FIG. 8 is a schematic view of a second module, with a valve, of the above integrated assembly.
Figure 9:
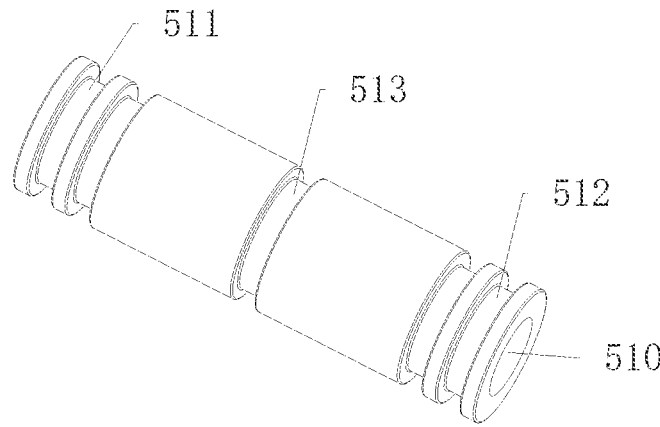
FIG. 9 is a schematic perspective view of a connection part of the above integrated assembly.
Figure 10:
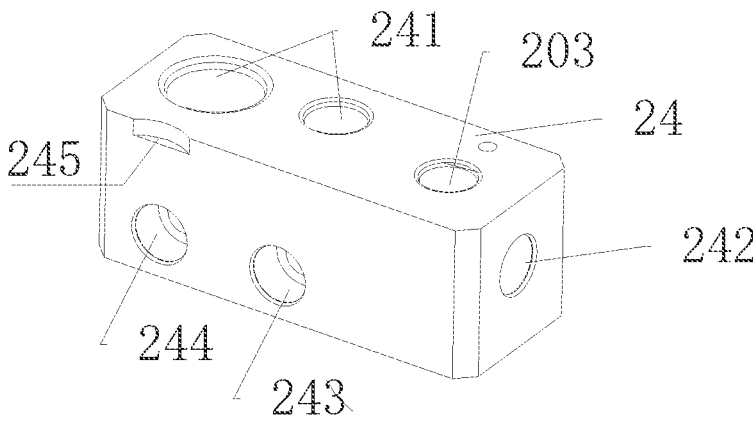
FIG. 10 is a schematic perspective view of the first module of the above integrated assembly.
Figure 11:
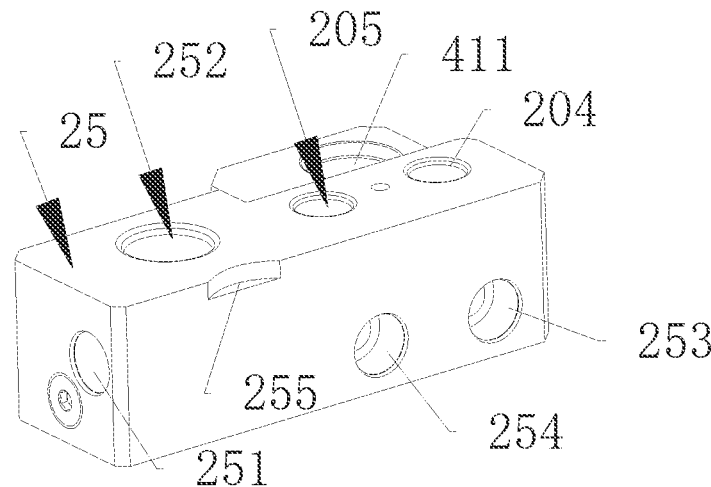
FIG. 11 is a schematic perspective view of the second module of the above integrated assembly.
Figure 12:
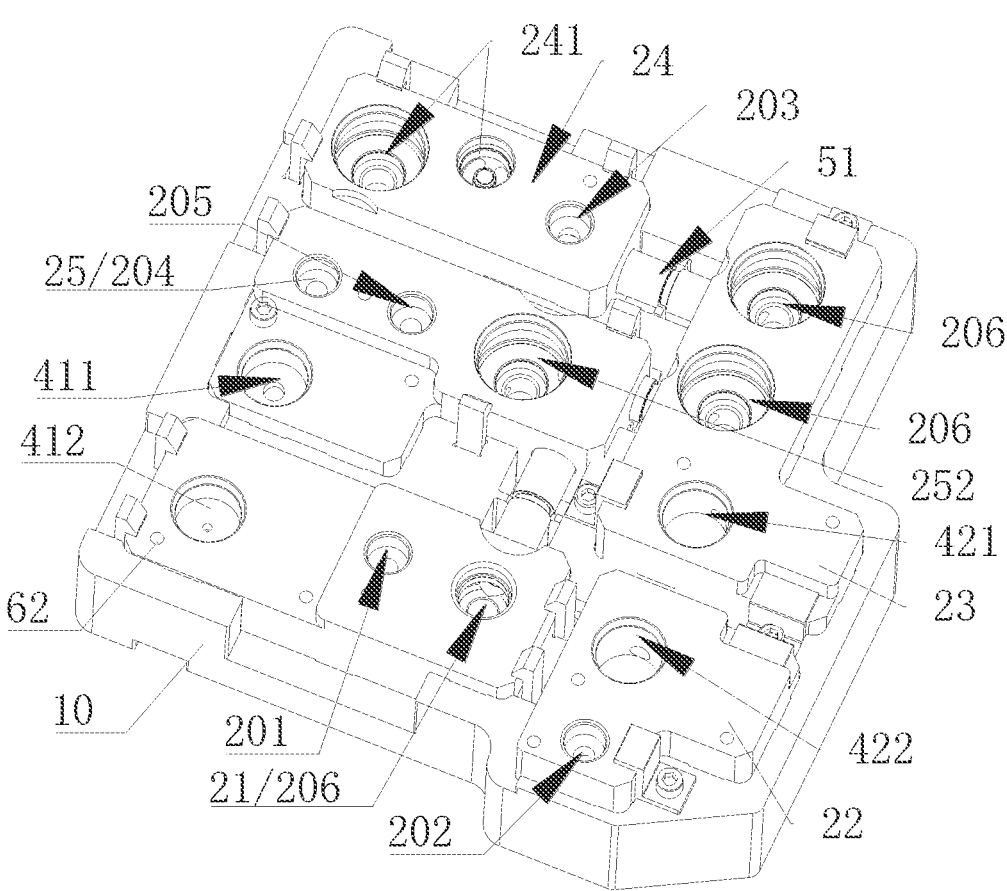
FIG. 12 is a schematic perspective view of a connection apparatus of the above integrated assembly.

A specific embodiment is taken as an example for description below. With reference to FIG. 1 to FIG. 12, FIG. 1 is a schematic perspective view of an integrated assembly according to an embodiment, FIG. 2 is a schematic perspective view of the integrated assembly shown in FIG. 1 viewed from back side, FIG. 3 is a schematic perspective view of the integrated assembly from another perspective, FIG. 4 is a schematic perspective view of the integrated assembly with two exploded parts, which is mainly for the sake of clarity and may not actually have this state, FIG. 5 is a partial schematic perspective view of a flow passage portion, with a valve, of the above integrated assembly, FIG. 6 is a schematic perspective view of a base portion of the above integrated assembly, FIG. 7 is a schematic view of a first module, with a valve, of the above integrated assembly, FIG. 8 is a schematic view of a second module, with a valve, of the above integrated assembly, FIG. 9 is a schematic perspective view of a connection part of the above integrated assembly, FIG. 10 is a schematic perspective view of the first module of the above integrated assembly, FIG. 11 is a schematic perspective view of the second module of the above integrated assembly, FIG. 12 is a schematic perspective view of a connection apparatus of the above integrated assembly.

The integrated assembly includes a connection apparatus, which includes a base portion 10 and a flow passage portion 20. The base portion 10 and the flow passage portion 20 may be limitedly arranged, and then is relatively fixed by a screw and/or a snap portion, or may be fixedly arranged. The integrated assembly may further include a control valve, a fluid assembly, a heat exchange assembly, a sensing element and the like. The connection apparatus is provided with an element connecting portion, which may be fitted and mounted with the control valve, the fluid assembly, the heat exchange assembly, the sensing element and other components.

The heat exchange assembly of this embodiment includes a first heat exchange portion 41 and a second heat exchange portion 42, each of which is a double-passage heat exchange portion. Components mounted on the integrated assembly specifically include a first valve 31, a second valve 32, a third valve 33, a fourth valve 34, a fifth valve 35, a sixth valve 36 and a seventh valve 37. The connection apparatus is provided with at least two or more external interface portions fitted and connected with other components of the system, where each of the external interface portions is provided with at least one or more external interfaces, which are arranged in the flow passage portion. The flow passage portion 20 includes multiple external interfaces of being fitted with the system. This embodiment specifically includes a first external interface 201, a second external interface 202, a third external interface 203, a fourth external interface 204 and a fifth external interface 205. The first external interface 201 is arranged in a third module 21, the second external interface 202 is arranged in a fourth module 22, the third external interface 203 is arranged in a first module 24, and the fourth external interface 204 and the fifth external interface 205 are arranged in a second module 25. The integrated assembly may further include a sensing element, and the sensing element may also be fitted and mounted with the element connection portion. Two of the modules can be connected and in communication with each other by a connection part, and/or connected and in communication with each other by a heat exchange component, and may also be connected and in communication with each other by the components.

The flow passage portion 20 includes a first module 24, a second module 25, a third module 21, a fourth module 22 and a fifth module 23. Each module is provided with an interface, where the interface on a side away from the base portion, such as the element connection portion, can be configured for mounting various components or being fitted and connected with the system, and such as the interface portion with an external interface, the lateral interface portion of which can be used for fitting and connecting with other modules. Hereinafter, the first module is taken as an example for description. With reference to FIG. 7, FIG. 10 and FIG. 12, the first module 24 may be manufactured by means of profile processing. An upward side of the first module 24, that is, a side opposite to the base portion 10 is provided with a third external interface 203 and two element connection portion 241, which are configured for fitting with the components, such as the first valve 31 and the second valve 32 in this embodiment. In case that a small number of components are to be mounted in the system, it is possible to reduce the number of the connection portion, so that the base portion can be standardized. The first module is provided with the interface portions 243 and 244 on a side close to the second module, and the first module is provided with the interface portion 242 on a side close to the fifth module 23. The connection part 51 connects the first module 24 with the fifth module 23. One end of the connection part 51 extends into a hole of a lateral interface portion 242 of the first module 24, and the other end of the connection part 51 extends into a hole of the lateral interface portion of the fifth module 23 and is relatively sealed by a sealing component 65. Two connection parts 51 simultaneously connect the first module 24 with the second module 25, where one end of one connection part 51 extends into a hole of the lateral interface portion 243 of the first module 24 and is relatively sealed by a sealing component 65, and the other end of this connection part 51 extends into a hole of the lateral interface portion 254 of the second module 25. Meanwhile, one end of the other connection part 51 extends into a hole of the lateral interface portion 244 of the first module 24, and the other end of the other connection part 51 extends into a hole of the lateral interface portion 253 of the second module 25 and is relatively sealed by a sealing component 65. In this embodiment, the first module is connected with the second module and the fifth module by the connection part and can be detachably connected, and the connection part is limited to the base portion.

With reference to FIG. 8, FIG. 11 and FIG. 12, the second module 25 can be manufactured by means of profile processing or forging or the like. The upward side of the second module 25, that is, the side away from the base portion 10 is provided with a fourth external interface 204, a fifth external interface 205, an element connection portion 252 and a heat exchange interface portion 411. The element connection portion 252 is configured for fitting with and mounting to the components, such as the third valve 33 in this embodiment. The second module is provided with interface portions 253 and 254 on a side close to the first module, and the second module is provided with an interface portion 251 on a side close to the fifth module 23. A connection part 51 connects the second module 25 with the fifth module 23. One end of the connection part 51 extends into a hole of the lateral interface portion 251 of the second module 25, and the other end of the connection part 51 extends into a hole of the lateral interface portion of the fifth module 23 and is relatively sealed by a sealing component 65. Two connection parts 51 simultaneously connect the first module 24 with the second module 25. The second module is further provided with an interface portion on a side opposite to the side where the interface portions 253 and 254 are arranged and is relatively close to the third module 21, and the second module is connected and in communication with the third module 21 by a connection part 51. One end of the connection part 51 extends into a hole of the lateral interface portion of the second module 25 and is relatively sealed by a sealing component 65, while the other end of the connection part 51 extends into a hole of the lateral interface portion of the third module 21 close to a side of the second module and is relatively sealed by a sealing component 65. The second module of this embodiment has interface portions on three sides, which are detachably connected with the first module, the fifth module and the third module by the connection parts, respectively, and the connection part and the base portion are limitedly arranged. In addition, the heat exchange interface portion 411 of the second module is configured for fitting and connection with and being in communication with the heat exchange portion, where one end for refrigerant interface of the first heat exchange portion 41 is fitted and connected with the first heat exchange interface portion 411 of the second module, and the other end for refrigerant interface of the first heat exchange portion 41 is fitted and connected with the second heat exchange interface portion 412 of the third module, so that the second module and the third module are respectively connected and in communication with each other by the connection part 51 and the first heat exchange portion 41. The third module is further provided with an element connecting portion 206 for mounting the components, such as the valve or the sensing element. The first heat exchange portion 41 may be a double-passage heat exchanger, one flow passage of which may be used for circulating refrigerant, and the other flow passage of which may be used for circulating coolant liquid or oil or the like. For example, the first heat exchange external interface portion 413 and the second heat exchange external interface portion 414 may be connected with a flow path of the cooling liquid of the system, and the third heat exchange external interface portion 423 and the fourth heat exchange external interface portion 424 of the second heat exchange portion may be connected with a flow path of the cooling liquid of the system.

The connection part can be referred to FIG. 9. The connection part 51 is provided with sealing grooves 511 and 512 at a position where the connection part 51 is fitted with the interface portion. The sealing grooves may be configured for placing the sealing element 65, and a hole between the connection part 51 and the interface portion of the module is sealed by the sealing element 65. In addition, a limiting portion 513 is arranged in a middle of the connection part 51, and correspondingly, the base portion 10 can be provided with a notch portion at the position corresponding to the connection part. The notch portion is configured for fitting with the mounting of the connection part, and a limit-fitting portion 121 may also be arranged at a side of the notch portion, so that the limit-fitting portion 121 is fitted with the limiting portion 513. The limit-fitting portion may be a convex structure as shown in the figure, and accordingly, the limiting portion may be a concave structure. In addition, they may also be arranged in a opposite way, for example, if the convex structure is arranged in the base portion as a limit-fitting portion, a convex structure is locally arranged in the connection part as a limit-fitting portion, which can also achieve relative position-limiting. For example, the limit-fitting portion 121 of the base portion is located in the groove of the limiting portion 513 in order to implement the relative position-limiting.

With reference to FIG. 2, FIG. 4 and FIG. 6, the base portion 10 may be made of plastic material by injection molding, or may be formed by extrusion or casting. The base portion 10 has a bottom plate portion 100, a frame 131 and a protrusion portion 132. The frame 131 and the protrusion portion 132 protrude upward from the bottom plate portion 100, and the bottom plate portion 100 may be in a complete structure. Alternatively, the bottom plate portion 100 may be provided with an incision portion 153 as shown in the figure, for the components passing through or be being easily mounted. The frame 131 may be arranged consecutively or may be provided with multiple gaps 1310 as shown in the figure. The cooperation of the frame 131 with the protrusion portion 132 allows each module being limited with the base portion. The base portion 10 has a first accommodating portion 101, a second accommodating portion 102, a third accommodating portion 103, a fourth accommodating portion 104 and a fifth accommodating portion 105. The base portion is also provided with multiple notch portions 111, 112, 113, 114, and 115 at the protrusion portion. In this embodiment, the number of the notch portion is five, where the notch portion 111 and 115 are arranged between the first accommodating portion 101 and the second accommodating portion 102, the notch portion 112 is arranged between the first accommodating portion 101 and the fifth accommodating portion 105, the notch portion 114 is arranged between the second accommodating portion 102 and the third accommodating portion 103, and the notch portion 113 is arranged between the second accommodating portion 102 and the fifth accommodating portion 105. The notch portion is mainly used for the fitting and the mounting of the connection part. In addition, it is also possible to provide a notch portion or a missing portion for reducing the weight. When the base portion is processed by injection molding, the frame 131, the protrusion portion 132 and the bottom plate portion 100 may be formed in integral structure. In order to improve the mechanical properties, such as anti-vibration performance, of the base portion, a convex rib may be further arranged on the bottom plate portion, for example, a first convex rib 141 and a second convex rib 142 are arranged on a back side of the bottom plate portion. The convex ribs may be arranged on a side opposite to the flow passage portion, that is, on the back side, so that the mold processing is relatively simple, and the first convex rib 141 and the second convex rib 142 are intersected with or connected with each other, thereby improving the corresponding strength. In addition, the convex ribs may also be arranged on a side facing the flow passage portion.

With reference to FIG. 1 and FIG. 4, the first module corresponds to the first accommodating portion 101 of the base portion, the second module is in corresponding to the second accommodating portion 102, the third module is in corresponding to the third accommodating portion 103, the fourth module is in corresponding to the fourth accommodating portion 104, and the fifth module is in corresponding to the fifth accommodating portion 105. Each module is at least partially located in the corresponding accommodating portion, and the frame 131 of the base portion cooperates with the inner protrusion portion 132, so that each module can be limited in the horizontal direction. The base portion may further include a snap portion 161, and the base portion and/or the flow passage portion may further be provided with a threaded-connection portion, and in addition to the limiting between the connection part connected to the module and the base portion, and in that case, even if the modules are not connected with each other by welding, the flow passage portion are limited with the base portion in the horizontal direction. After the flow passage portion and the base portion are assembled, they can be fixed by fitting screws and/or clamped by the snap portion, so that a reliable fixation between these two can be achieved. The snap portion may be an integral structure formed during injection molding, such as the snap portion 161 shown in FIG. 1, which is used for clamping the third module 21, and the flow passage portion such as the third module is also provided with a threaded-fit portion 62, which facilitates the fixation with the heat exchange portion or other components by the threaded-connection portion 63. In addition, threaded holes may also be provided in the base portion 10. For example, a threaded-fit portion 151 may be arranged at certain positions of the base portion 100, the frame 131 and the protrusion portion 132, and the threaded-fit portion is fitted with the threaded-connection portion 63 for threaded connection. The portion may also be a structure snapped with the body of the base portion. A snap-fit portion 152 is arranged at the body of the base portion, such as the bottom plate portion 100, the frame 131 and the protrusion portion 132, and the snap portion 61 passes through the snap-fit portion 152 and is clamped with the body of the base portion, and is used for clamping the modules of the flow passage portion and/or the components, so as to achieve a relative fixation by fitting with the limiting structure. In addition, the fixing manners for the components with the flow passage portion and the base portion may be other kind of fixing manners, for example, the mounting plate 64 with a bent structure is adopted, and the mounting plate 64 is connected to the body of the base portion or the module of the flow passage portion by a threaded connection portion. In that case, the mounting plate 64 can press the module or the component that needs to be fixed, which cooperates with other limiting or fixing manners such as a limiting structure, in order to implement limiting and fixing.

Figure 13:
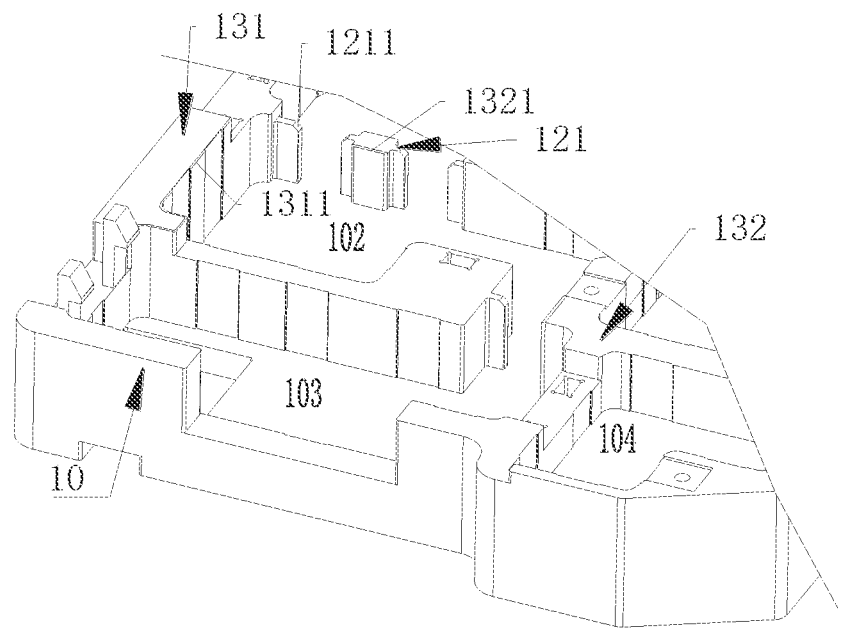
FIG. 13 is a partial schematic view of a base portion of an integrated assembly according to another embodiment.

In order to facilitate the mounting of the flow passage portion and the base portion, each accommodating portion can be slightly larger than the fitting part of the corresponding module, for example, the first accommodating portion 101 is slightly larger than the part where the first module 24 is located in the first accommodating portion 101, the second accommodating portion 102 is slightly larger than the part where the second module is located in the second accommodating portion 102, the third accommodating portion 103 is slightly larger than the part where the third module 21 is located in the third accommodating portion 103, the fourth accommodating portion 104 is slightly larger than the part where the fourth module 22 is located in the fourth accommodating portion 104, and the fifth accommodating portion 105 is slightly larger than the part where the fifth module 23 is located in the fifth accommodating portion 105. In addition, for easy mounting, the accommodating portion for each module may be provided with a corresponding guide structure. With reference to FIG. 13, the second accommodating portion 102 corresponding to the second module is taken as an example for sake of simple explanation in FIG. 13. On a peripheral wall of the second accommodating portion 102, the parts of the frame 131 and the protrusion portion 132 most closed to the second module are used as limiting portion. Said limiting portions are provided with guide portions, which includes a guide portion 1311 arranged at the frame 131 and a guide portion 1321 arranged at the protrusion portion 132. The guide portion 1311 is arranged at a part of the frame that performs a limiting function, and the guide portion 1321 is arranged at a part of the protrusion portion that performs a limiting function. For example, the guide portion 1311 and the guide portion 1321 are respectively arranged at the parts where both sides of the second accommodating portion are relatively closest to the second module. The second module may further be provided with a guide portion at a part, which performs the limiting function, of the protrusion portion opposite to the guide portion 1311 of the frame 131, thus forming a better guide structure. During assembly, four sides of the second module can be all guided by the guide portion, so that automatic assembly can be better achieved. Herein, the protrusion portion and the outer frame may be discontinuous or continuous. In addition, other type of guide structures are also possible, for example, the accommodating portion can be in a form in which an upper part is slightly greater than a bottom part, so that the fitting between the corresponding module and the upper part is relatively loose, and the fitting between the module and the lower part is relatively compact, for example, a small gap exists in the local area, so that the mounting is also convenient and simple, and the purpose of the guide structure can also be achieved, and the guide structure is not limited to these two types. Similarly, in addition to the guide structure for respective module, the base portion may also be provided with guide portions for other components of the flow passage portion. For example, the connection part 51 may be provided with a guide portion 1211 in addition to a limit-fitting portion. In addition, if the flow passage portion further includes other components, corresponding guide portions may be further provided, so that the assembly of the flow passage portion and the base portion as a whole is more convenient.

The flow passage portion 20 is mainly used for mounting various components, such as a valve, a fluid assembly, a heat exchange assembly, a sensing element and the like. In order to better limit the various components, a limit portion may be arranged in the flow passage portion. For example, a limit portion 245 is arranged close to the element connection portion 241 of the first module 24, which can limit the first valve in a circumferential position, and for example, a limiting portion 255 is arranged close to the element connection portion 252 of the second module 25, which can limit the third valve in a circumferential position. The limiting manner can be determined according to the structure of the component and the module, which will not be limited here.

The integrated assembly includes the connection apparatus and various components connected with the connection apparatus. These components may be limitedly connected or fixedly connected or limitedly connected and fixed with the connection apparatus. The components may be one or more of a valve (such as an electronic expansion valve, an expansion valve, an electric valve, and a one-way valve), a sensing element for detection, a liquid reservoir, a separator, a heat exchange component and the like. These components may be in form of complete component. Alternatively, these components may be the main body portion, and a part of the main body portion can be formed by the flow passage portion, for example, said part formed by the flow passage portion is combined with the main body portion. For example, the component is the main body portion of the expansion valve, and the valve body can be matched with the structure of the element mounting portion of a certain module of the flow passage portion, and then are combined with each other to form the expansion valve. The same can apply to other components. In this embodiment, the integrated assembly includes two heat exchange portions and six components for control and/or detection. The heat exchange portions are connected with the flow passage portions through the heat exchange interface portion, and the heat exchange portions may be fixed or limited with the flow passage portions, and may also be fixed or limited with the base portion. For example, the heat exchange portions and the flow passage portions in this embodiment are fitted and connected with the threaded-connection portion by the threaded-fitting portion, that is, they are fixed in a threaded-connection or snap-fit manner, so that the heat exchange portions and the flow passage portions can be relatively fixed. The connection between the flow passage portion and each component can also be implemented by means of one or more of snap-fit, threaded connection, limiting, mounting plate combined with threaded connection portion and the like. The heat exchange portion can be connected with one or two modules. The flow passage portion is provided with an interface portion required for fitting and mounting, for example for being connected with the fluid assembly such as a liquid reservoir, a separator and the like. The flow passage portion includes an interface portion that is fitted with the assembly components. If required to be connected with the heat exchange portion, the flow passage portion includes an interface portion fitted with the heat exchange portion. In addition, the integrated assembly is used to cooperate with the system. The integrated assembly of this embodiment further includes five interface portions for being connected with the system, and each of the five interface portions has an external interface for being fitted with the system.

In this embodiment, the base portion 10 and the flow passage portion 20 are relatively fixed by means of limit fitting and threaded connection or by means of snap fitting, and are fixed in a detachable way. The modules are movably connected with each other by connection parts, in addition to the limiting of the base portion, and thus the maintenance is relatively convenient. In addition, the modules may be fixed with each other by welding, that is, two ends of the connection parts may be fixed with the two modules required to be connected by welding, except that the position is relatively fixed after welding, and a relatively large tolerance range is needed when being assembled with the base portion. The base portion may be provided with a threaded-fit portion 62 and an integral snap portion 161, that is, the threaded-fit portion 62 and the snap portion 161 may be integrated with the bottom plate portion of the base portion, or the base portion may be provided with the snap portion and the threaded-fit portion arranged in a clamping way, where the threaded-fit portion and the snap portion may be limited or clamped with the main body portion of the base portion, such as the bottom plate portion or the frame and the protrusion portion. The base portion includes the threaded-fit portion and the snap portion that are arranged to be fitted with the main body portion of the base portion. The base portion may be a made of plastic, which is formed by injection molding, and the snap portion and the threaded-fit portion can be integrated with the plate portion, both of which are formed by injection molding. The base portion may also be made of other materials, for example, the main body of the base portion is made of metal material such as aluminum alloy, and the snap portion and the threaded-fit portion can be fixed with the main body of the base portion by welding or be relatively fixed with the main body of the base portion by clamping.

The connection apparatus has multiple element connection portions, the opening of which is arranged opposite to the bottom plate portion 100 of the base portion, and the external interfaces are also arranged opposite to the bottom plate portion 100 of the base portion, which facilitates of detection and mounting. The flow passage portion has multiple lateral interface portions, for example, the first module is provided with three lateral interface portions, the second module is provided with four lateral interface portions, the third module is provided with two lateral interface portions, the fourth module is provided with one lateral interface portions, and the fifth module is provided with two lateral interface portions. The lateral interface portions are mainly used for fitting and connection with other modules. The location and quantity of the provided lateral interface portions may be determined based on the system requirement, and the arrangement of the external interfaces is also related to the system and may be arranged as required. Herein, the lateral interface portion is defined relative to the upper side and the lower side, and may be arranged at any periphery side. Each two corresponding modules of all the modules may be connected and in communication with each other through the connection part or through other components such as heat exchange component, for example, the second module and the third module are simultaneously connected with the first heat exchange portion through the connection part, and the fourth module and the fifth module are connected and in communication with each other through the second heat exchange portion. The connection part may be a pipe-connection part, and the first module is connected and in communication with two of other modules respectively through the pipe-connection part, where the first module is connected and in communication with each of the second module and the fifth module through the pipe-connection part, respectively. The second module is connected and in communication with the first module, the third module and the fifth module through the pipe-connection part, respectively, while the second module is also connected and in communication with the third module through the heat exchange portion. The third module and the fourth module are connected and in communication with each other through the pipe-connection part, the fourth module and the fifth module are connected and in communication with each other through the second heat exchange portion, and the fifth module is connected and in communication with the first module and the second module through the pipe-connection part, respectively. The pipe-connection parts connected between the modules are connected through the lateral interface portions of the modules.

The integrated assembly may further include a sensing element, which may also be arranged to be fixed or limited with the element connecting portion. The integrated assembly may further include a fluid assembly, and the fluid assembly is fixed or limited with the interface portion corresponding to the flow passage portion. The control valve may have multiple valves with various functions, and is not limited herein. The first heat exchange portion 41 and the second heat exchange portion 42 each may be a double-passage heat exchanger. In this embodiment, both of the first heat exchange portion 41 and the second heat exchange portion 42 can be used for heat exchange between refrigerant and cooling liquid, and can also be used for heat exchange between relatively high-temperature refrigerant and relatively low-temperature refrigerant. The two flow passages inside can be used for circulation and heat exchange of the refrigerant. The second heat exchange portion 42 can be used for heat exchange between the refrigerant and the heat transfer medium, and one of the two flow passages can be used for the circulation of the refrigerant and the other one of the two flow passages can be used for the circulation and heat exchange of the heat transfer medium.

The flow passage portion 20 has a first heat exchange interface portion 411, a second heat exchange interface portion 412, a third heat exchange interface portion 421 and a fourth heat exchange interface portion 422. The second module includes the first heat exchange interface portion 411, the third module includes the second heat exchange interface portion 412, the fourth module includes the fourth heat exchange interface portion 422, and the fifth module includes the third heat exchange interface portion 421. The first heat exchange portion 41 includes a first heat exchange external interface portion 413 and a second heat exchange external interface portion 414, and the second heat exchange portion 42 includes a third heat exchange external interface portion 423 and a fourth heat exchange external interface portion 424. The first heat exchange portion 41 has four interfaces, two of which are in communication with the first heat exchange interface portion 411 of the second module 24 and the second heat exchange interface portion 412 of the third module respectively, and the other two of which can be in communication with the coolant flow path of the system. The first heat exchange interface portion 411 and the second heat exchange interface portion 412 are in communication with each other through the first flow passage of the first heat exchange portion. The first heat exchange external interface portion 413 and the second heat exchange external interface portion 414 are in communication with each other through the second flow passage of the first heat exchange portion. The second heat exchange portion 42 has four interfaces, two of which are in communication with the fourth heat exchange interface portion 422 of the fourth module 22 and the third heat exchange interface portion 421 of the fifth module respectively, and the other two of which can be in communication with the coolant flow path of the system. The third heat exchange interface portion 421 and the fourth heat exchange interface portion 422 are in communication with each other through the first flow passage of the second heat exchange portion. The third heat exchange portion outer interface portion 423 and the fourth heat exchange portion outer interface portion 424 are in communication with each other through the second flow passage of the second heat exchange portion.

For different systems, the connection manners may also be different. The heat exchange portion may be fixedly connected with the flow passage portion through the threaded-connection portion, and may also be fixedly connected with the base portion through the threaded-connection portion, and even may be connected with the flow passage portion and the base portion through the threaded-connection portion simultaneously. For example, a part of the threaded-connection portions connect the heat exchange portion with the base portion, and another part of the threaded-connection portions connects the heat exchange portion with the flow passage portion. In this way, the strength of the flow passage is strengthened, and the integrated assembly has better stability.

The integrated assembly has multiple external interfaces, which are respectively connected and in communication with different parts of the system. With the configuration of the integrated assembly, the connection and mounting of thermal management system are relatively simple and convenient. In a specific thermal management system, in addition to the integrated assembly, the thermal management system further includes a compressor, an external heat exchanger, a heat dissipation heat exchanger or a condenser, an evaporator, an intermediate heat exchanger and a vapor-liquid separator. The second external interface 202 is in communication with the condenser outlet of the system, the third external interface 203 is in communication with one interface of the external heat exchanger of the system, the first external interface 201 is in communication with the intermediate heat exchanger of the system, the fourth external interface 204 is in communication with the vapor-liquid separator of the system, and the fifth external interface 203 is in communication with the evaporator of the system. In the condition of heating, the refrigerant from the compressor enters the integrated assembly through the second external interface 202 via the heat dissipation heat exchanger, and flows to the intermediate heat exchanger through the first external interface 201 and throttled by the expansion valve in the integrated assembly, and then passes through the intermediate heat exchanger to the external heat exchanger, and then enters the integrated assembly through the third external interface 203, and then flows out of the integrated assembly through the fourth external interface 204 and flows to the vapor-liquid separator of the system, and then returns back to the compressor. Under the condition of refrigeration, the refrigerant from the compressor enters the integrated assembly through the second external interface 202 via the heat dissipation heat exchanger (which substantially does not exchange heat at this time), and then passes through the third external interface 203 from the integrated assembly and flows to the external heat exchanger (at which the heat exchanging is performed), and then the refrigerant flows to the intermediate heat exchanger to perform the heat exchanging, and then the refrigerant enters the integrated assembly through the first external interface 201, and is divided into two parts in the integrated assembly, where one part flows to the evaporator through the fifth external interface 205, and the other part flows out of the integrated assembly through the fourth external interface 204 and flows to the vapor-liquid separator of the system. The part of refrigerant flowing out from the evaporator also passes through the vapor-liquid separator. The two parts of the refrigerant flow back to the compressor after being merged.

In the above-mentioned connection apparatus, the base portion and the flow passage portion are arranged separately, so that the flow passage portion can be formed by combining required modules. Meanwhile, the relatively limiting or fixing of the connection apparatus is implemented by the base portion. Therefore, it facilities of manufacturing of the above-mentioned connection apparatus. In addition, with the assembly in a combination way, each module can be tested independently, or the flow passage portion can be tested before the final assembly, which facilitates the processing and can reduce the cost loss caused by defective products accordingly. Dividing the integrated assembly into various modules can effectively reduce the direct heat conduction between the cold flow passage and the hot flow passage. Each of the modules is connected by the assembled pipe-connection parts, and the flow passage portion is limited or fixed with the base portion by snap-fit or mounting plate or in a screw connection way. The assembly process is simple without welding and other processes, which can effectively reduce the process cost and quality loss. In addition, in the above embodiment, the flow passage portion includes five modules and three interface portions, which is not necessary. It is possible to set the configuration based on the requirement for easy manufacturing, for example, only three modules are provided.

During assembling, the flow passage portion can be assembled together first, and then the flow passage portion and the base portion can be assembled. In addition, some part of the components can be assembled with modules first, then the modules are assembled together, and then the assembled modules are assembled with the base portion to form an integrated assembly. Specifically, some valves can be assembled with corresponding modules respectively. For the other valves such as valves with coils, the components of said valves, except coils thereof, can be assembled with modules, then the assembled modules are assembled with the base portion, and then the corresponding coils are mounted to form an integrated assembly. In this solution, the base portion can be standardized, and only the structure of the modules or the structure of part of the modules is needed to adjust for different systems, and thus the connection is convenient, and the integral flow passage portion is no longer adopted. Compared with the case that the high and low temperature refrigerant flow passages are arranged together, the heat transfer loss of the refrigerant in the flow passage portion between the high and low temperature flow passages can be relatively reduced.

It should be noted that the above embodiments are only for explaining the present disclosure and are not intended to limit the technical solutions described in the present disclosure. Although the present disclosure has been described in detail with reference to the embodiments described above, it should be understood by those skilled in the art that modifications or equivalent substitutions can still be made to the present disclosure by those skilled in the art, and all the technical solutions and modifications thereof without departing from the spirit and scope of the present disclosure fall within the scope of the claims.

The invention claimed is:

1. A connection apparatus, comprising a base portion, a flow passage portion, and at least one connection part, wherein
   the base portion and the flow passage portion are fixed to each other;
   the flow passage portion comprises at least three modules separately formed;
   the base portion comprises accommodating portions which are configured to receive and fix at least part of the respective modules, and a notch portion which is at least arranged between two adjacent accommodating portions; and
   the at least one connection part is connected between the modules located in the two adjacent accommodating portions and is at least partially located in the notch portion.

2. The connection apparatus according to claim 1, wherein the base portion is provided with a concave or convex structure, the connection part is provided with a convex or concave structure engaged with the concave or convex structure of the base portion; and
   the base portion comprises a frame and a protrusion portion, wherein the frame is arranged outside of the protrusion portion; and the number of the accommodating portions is equal to the number of the modules, and part of the protrusion portion is arranged between the accommodating portions.

3. The connection apparatus according to claim 1, wherein the two adjacent accommodating portions provided with the notch portions are defined as a first accommodating portion and a second accommodating portion, the module at least partially located in the first accommodating portion is defined as a first module, and the module at least partially located in the second accommodating portion is defined as a second module, and the connection part of the connection apparatus connects the first module with the second module; a protrusion portion is arranged between the first accommodating portion and the second accommodating portion and protrudes from a bottom plate portion of the base portion; and a limiting or fixing of the flow passage portion with the base portion is implemented by at least one fixing manner of snap fitting, threaded connection and mounting plate combined with screw connection.

4. The connection apparatus according to claim 2, wherein the two adjacent accommodating portions provided with notch portions are defined as a first accommodating portion and a second accommodating portion, the module at least partially located in the first accommodating portion is defined as a first module, and the module at least partially located in the second accommodating portion is defined as a second module, and the connection part of the connection apparatus connects the first module with the second module; the protrusion portion is arranged between the first accommodating portion and the second accommodating portion and protrudes from the bottom plate portion of the base portion; and a limiting or fixing of the flow passage portion with the base portion is implemented by at least one of the fixing manners of snap fitting, threaded connection and mounting plate combined with screw connection.

5. The connection apparatus according to claim 4, wherein the connection apparatus further comprises: at least three element connection portions arranged opposite to the bottom plate portion of the base portion and configured as interface portions for connection to components; and at least three external interfaces with openings arranged opposite to the bottom plate portion of the base portion;

wherein one of the first module and the second module is provided with at least three lateral interface portions, which are respectively arranged on at least two sides of the first module, and the other one of the first module and the second module is provided with at least two lateral interface portions.

6. The connection apparatus according to claim 5, wherein the flow passage portion further comprises a third module, a fourth module and a fifth module, and the base portion further comprises a third accommodating portion, a fourth accommodating portion and a fifth accommodating portion; the third module is at least partially located in the third accommodating portion, the fourth module is at least partially located in the fourth accommodating portion, and the fifth module is at least partially located in the fifth accommodating portion; the notch portion is arranged between the second accommodating portion and the third accommodating portion, and the connection part is provided for a connection between the second module and the third module, and the connection part connecting the second module with the third module is at least partially located in the notch portion between the second accommodating portion and the third accommodating portion.

7. The connection apparatus according to claim 1, wherein the two adjacent accommodating portions provided with the notch portions are defined as a first accommodating portion and a second accommodating portion, the module at least partially located in the first accommodating portion is defined as a first module, and the module at least partially located in the second accommodating portion is defined as a second module, and the connection part of the connection apparatus connects the first module with the second module; one of the first module and the second module is provided with at least three lateral interface portions, which are respectively arranged on at least two sides of the first module, and the other one of the first module and the second module is provided with at least two lateral interface portions;

the connection part is provided with a sealing groove at a position where the connection part is fitted with the interface portion, and the connection apparatus further comprises a sealing component at least partially located and fitted in the sealing groove to achieve sealing between the connection part and the interface portion of the module; and the connection part is further provided with a concave or convex structure, and a convex or concave structure is arranged at a position of the base portion corresponding to the connection part and is configured to be engaged with the concave or convex structure of the connection part.

8. The connection apparatus according to claim 7, wherein the base portion comprises a bottom plate portion in which a hole is provided, a main body portion of the base portion is made of plastic, and the base portion comprises a snap portion or a threaded-connection portion, wherein the snap portion or the threaded-connection portion is integral with or fixed to the main body portion of the base portion; and the main body portion of the base portion comprises a first convex rib and a second convex rib, wherein the first convex rib and the second convex rib protrude from the bottom plate portion, and the first convex rib is intersected with or is connected with the second convex rib.

9. The connection apparatus according to claim 2, wherein the frame has a notch portion; the frame and/or the protrusion portion is provided with guide portions, and each of the guide portions is adjacent to the accommodating portion; and each accommodating portion corresponds to at least two guide portions.

10. The connection apparatus according to claim 1, wherein the base portion comprises a bottom plate portion, a side of the bottom plate portion of the base portion is defined as a lower part, and an upper part of the accommodating portion is larger than the lower part of the accommodating portion, and the accommodating portion is larger than a fitting part of the module corresponding to the accommodating portion.

11. The connection apparatus according to claim 7, wherein the base portion comprises a bottom plate portion, a side of the bottom plate portion of the base portion is defined as a lower part, and an upper part of the accommodating portion is larger than the lower part of the accommodating portion, and the accommodating portion is larger than a fitting part of the module corresponding to the accommodating portion.

12. An integrated assembly, comprising the connection apparatus according to claim 1, wherein the integrated assembly comprises at least three valves, which are arranged to be fixed or limited with the connection apparatus; the integrated assembly comprises at least one of a sensing element, a fluid assembly and a heat exchange portion which is limited or fixed with the connection apparatus; a limiting or fixing manner of the valves with the connection apparatus comprises at least one of fixing manners such as snap fitting, threaded connection and mounting plate combined with thread connection; and a limiting or fixing manner for the sensing element or fluid assembly or heat exchange portion with the connection apparatus comprises at least one of snap fitting, threaded connection and mounting plate combined with thread connection.

13. The integrated assembly according to claim 12, comprising a heat exchange portion, which comprises two flow passages, and the heat exchange portion has four interfaces, wherein at least one interface of the heat exchange portion is connected with one of the modules, and one interface of the heat exchange portion is connected with another module; and at least two of the modules are connected with each other through the heat exchange portion.

14. The connection apparatus according to claim 8, wherein the base portion comprises a bottom plate portion, a side of the bottom plate portion of the base portion is defined as a lower part, and an upper part of the accommodating portion is larger than the lower part of the accommodating portion, and the accommodating portion is larger than a fitting part of the module corresponding to the accommodating portion.

15. The connection apparatus according to claim 9, wherein the base portion comprises a bottom plate portion, a side of the bottom plate portion of the base portion is defined as a lower part, and an upper part of the accommodating portion is larger than the lower part of the accommodating portion, and the accommodating portion is larger than a fitting part of the module corresponding to the accommodating portion.

* * * * *